United States Patent
Anand et al.

(10) Patent No.: US 7,163,388 B2
(45) Date of Patent: Jan. 16, 2007

(54) METHOD AND APPARATUS FOR INCORPORATING LUMENS INTO THE WALL OF A TUBULAR EXTRUSION

(75) Inventors: Prem Anand, Waterloo (CA); Joseph T. Chapin, Petersburg, FL (US)

(73) Assignee: Cangen Holdings, Inc., Chamblee, GA (US)

( * ) Notice: Subject to any disclaimer, the term of this patent is extended or adjusted under 35 U.S.C. 154(b) by 273 days.

(21) Appl. No.: 10/849,341

(22) Filed: May 19, 2004

(65) Prior Publication Data

US 2005/0260374 A1 Nov. 24, 2005

(51) Int. Cl.
*B29C 47/06* (2006.01)
*B29C 47/22* (2006.01)

(52) U.S. Cl. ............... 425/131.1; 425/186; 425/192 R; 425/380; 425/381; 425/462; 425/465; 425/466; 425/467

(58) Field of Classification Search ............. 425/131.1, 425/132, 186, 192 R, 380, 381, 462, 465, 425/466, 467
See application file for complete search history.

(56) References Cited

U.S. PATENT DOCUMENTS

| | | | | |
|---|---|---|---|---|
| 1,281,592 A | * | 10/1918 | Laskey | 425/4 C |
| 3,228,356 A | * | 1/1966 | Schafer | 425/462 |
| 3,372,920 A | * | 3/1968 | Corbett et al. | 264/508 |
| 3,473,193 A | * | 10/1969 | Quackenbush et al. | 425/131.1 |
| 4,012,936 A | * | 3/1977 | Sebastiani | 72/369 |
| 4,138,457 A | * | 2/1979 | Rudd et al. | 264/500 |
| 4,277,432 A | * | 7/1981 | Woinowski | 264/171.24 |
| 4,321,228 A | * | 3/1982 | de Kok | 264/209.8 |
| 4,323,339 A | * | 4/1982 | de Kok et al. | 425/199 |
| 4,384,901 A | * | 5/1983 | Swoboda et al. | 148/195 |
| 5,449,281 A | * | 9/1995 | Dupart et al. | 425/131.1 |
| 6,729,867 B1 | * | 5/2004 | Peter et al. | 425/132 |

FOREIGN PATENT DOCUMENTS

JP 3-93523 * 4/1991

* cited by examiner

*Primary Examiner*—Robert Davis
*Assistant Examiner*—Joseph Leyson
(74) *Attorney, Agent, or Firm*—Jaeckle Fleischmann & Mugel, LLC

(57) ABSTRACT

A polymer extrusion head for forming continuous shapes having one or more lumens therein. The head includes an extrusion mandrel and die. At least one lumen pipe is disposed radially through a port in the die to intersect the polymer flow in the annular region between the tip and the die. The lumen pipe is a welded assembly having a 90° turn formed as a mitered joint with zero bend radius. The lumen pipe is held in a pin vise engaged in the die such that position of the lumen pipe may be readily adjusted. Axial and radial positions are established during assembly by means of a gauge block. A plurality of lumen pipes may be accommodated for a plurality of lumens by a manifold distribution system including individual lumen pipe assemblies.

3 Claims, 5 Drawing Sheets

US 7,163,388 B2

METHOD AND APPARATUS FOR INCORPORATING LUMENS INTO THE WALL OF A TUBULAR EXTRUSION

TECHNICAL FIELD

The present invention relates to method and apparatus for extrusion forming of molten polymer material; more particularly, to extrusion heads for continuous extruding of hollow or solid shapes; and most particularly, to method and apparatus for forming longitudinal voids or inclusions in such extruded shapes.

BACKGROUND OF THE INVENTION

Extrusion heads for continuous extrusion forming of continuous plastic elements having specific cross-sectional shapes are well known. Such extruded elements may include, for example, pipes, rods, moldings, tubings, and the like.

In a typical prior art extrusion system, solid pellets of the thermoplastic material to be used are fed into a progressive-screw extruder wherein the pellets are liquefied under high pressure and are injected into an extrusion head. Such injection may be made axially of the extrusion head, as is commonly done for extrusion of solid shapes and tubes, or transversely of the extrusion head, as is commonly done for coating of a core stock being passed axially through the head. Axial injection is known in the art as "inline," and transverse injection is known in the art as "crosshead." In cross-head injection, the molten extrudate enters the extrusion head at an angle, typically 90°, to the axis of the head. Crosshead extrusion is especially useful in applying coatings to rigid core forms such as rods, wire, and lumber.

Prior art extrusion heads are known to be used in forming longitudinal voids, inclusions, and stripes in extruded shapes such as rods, tubes, and core material coatings. For example, the colored insulative coating on electric wire such as bell wire typically includes a different colored stripe to aid in wire identification in a wire bundle.

A particularly demanding extruded form is tubing having a central passage and one or more smaller passages formed in the tubing wall. Such passages are known in the art as "lumens." The lumens may be open passages or may be filled with different colors of the wall material or may be filled with entirely different material. For example, a medical catheter may require one or more open wall lumens and may also require a lumen filled with a radio-opaque material such as barium sulfate. The formation of such tubing and lumens requires a high level of precision in the extrusion dies and in the placement of die elements for forming the lumens.

In a prior art cross-head extrusion head for forming tubing having lumens, molten polymer is injected into the head and is shaped into an annular flow around a cylindrical mandrel. The flow is then squeezed along a conically tapered section of the mandrel and then along another, smaller diameter cylindrical section of the actual extrusion tip and die. An axial pipe extends through the mandrel and the die as an extrusion tip for forming and supporting the principal axial passage in the extruded tubing. Typically, air is injected through the central pipe to keep the tubing properly inflated as it is extruded. A linear pipe of smaller diameter, such as a hypodermic needle and referred to herein as a "lumen pipe," is disposed in an off-axis passage formed through the mandrel parallel to the central pipe and extends to the extrusion end of the die. During tubing extrusion, air is injected through the lumen pipe to continuously form a void (lumen) in the tubing wall. If a filled lumen is desired instead, an appropriate material may be injected through the lumen pipe instead of air.

At least two significant problems are known in forming lumens in the prior art.

First, because the lumen pipes are disposed in bores in the mandrel, the positions of the pipes are fixed. This means that the position of the pipe within the die cannot be adjusted, although such adjustment may be highly desirable to compensate for errors in bore location or in the pipes themselves. Also, a user may desire to change the radial location of a lumen. Further, because the lumen pipes become part of the mandrel, their radial position is fixed with respect to the inner diameter of the extrusion. Both the mandrel and the die must be changed to change over to a different diameter extrusion.

Second, because the lumen pipes extend from the mandrel, they must necessarily intersect the conical portion thereof. It is known that flow disturbances around the pipes at their angular exit from the mandrel can remain in the wall of the extruded tubing and can be both cosmetically and functionally undesirable.

Third, because the diameters of the off-axis bores are fixed and selected for a given diameter lumen pipe, each mandrel is dedicated to extrusions having that size lumen. The diameter of a lumen cannot be changed without changing the mandrel. Thus, for a facility producing a large number of different extrusions, an equally large number of different mandrels is required.

What is needed in the art is a means for extruding a shape having at least one wall lumen wherein the lumen pipe may be accurately and adjustably positioned when an extrusion head is assembled.

What is further needed is a means whereby the position of the lumen within the wall may be readily adjusted as desired after assembly of an extrusion head.

What is further needed is a means whereby a single mandrel may be used for a plurality of lumen-forming extrusion dies.

What is further needed is a means for preventing or minimizing flow disturbances in the walls of lumen-containing shapes.

What is further needed is a means for changing a lumen pipe without having to change either the die or the mandrel.

It is a principal object of the present invention to provide apparatus for extruding lumen-containing shapes wherein the location of a lumen within the shape may be accurately established prior to beginning of extrusion and may be readily adjusted as desired during extrusion.

It is a further object of the present invention to provide apparatus for extruding lumen-containing shapes wherein a plurality of such shapes may be generated without requiring a change in the extrusion mandrel.

SUMMARY OF THE INVENTION

Briefly described, a polymer extrusion head in accordance with the invention for extruding continuous shapes having one or more lumens or stripes therein includes an inner extrusion mandrel and an outer extrusion body and die. An annular flow path for polymer is formed therebetween, similar to the prior art. Preferably, the mandrel is provided with an integral cylindrical tip rather than a separate axial pipe, as in the prior art. At least one lumen pipe is disposed radially through a port in the die to intersect the polymer flow in the smaller-diameter annular region of flow between the tip and the die. The lumen pipe is a welded assembly of first and second portions having a 90° turn therebetween which preferably is a mitered joint with zero bend radius, such that the first portion is disposed radially of the die through a bore in the die wall, and thus is orthogonal to the material flow through the die, and the second portion is disposed axially of the die within the annular flow region, and thus is disposed parallel to the material flow through the die. The first portion is held in a chuck-type pin vise that is sealably engaged in a counterbore in the wall of the die such that the radial position of the lumen pipe assembly may be readily adjusted as desired. Preferably, the axial alignment and radial position are established during assembly by means of an appropriately shaped gauge block that is inserted into the extrusion opening between the tip and the die, after which the pin vise is tightened.

In a first embodiment, the wall bore is formed along a joint between planar faces of the extrusion body and the extrusion die such that the 90°-angled welded lumen pipe assembly may be positioned on the die face and then captured by the body face. Any number of separate bores and welded lumen pipes may be provided as needed for a desired number of lumens.

In a second embodiment, wherein it is desired to form a plurality of lumens using a common injectant, the die includes a distribution manifold formed in the die face, and individual lumen pipe assemblies are disposed radially as required between the distribution manifold and the die annular flow region.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
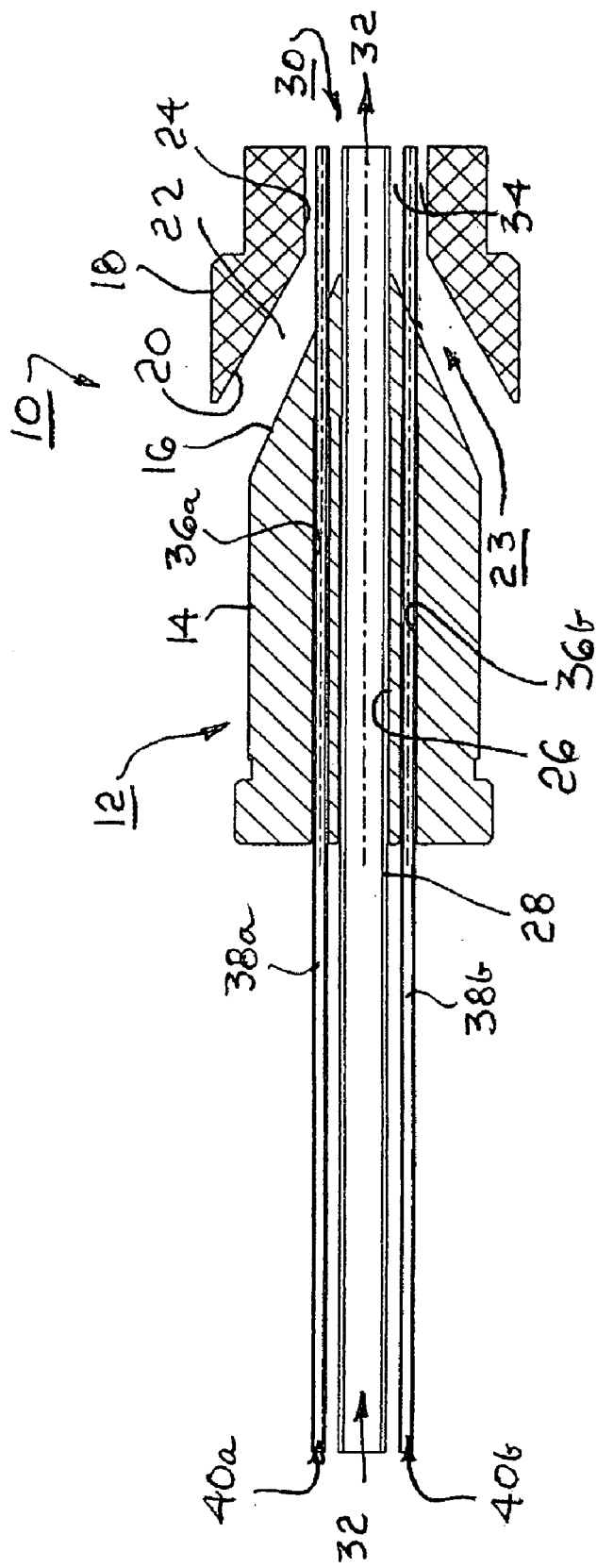
FIG. 1 is a cross-sectional view of a portion of a prior art lumen-forming extrusion head.
Figure 2:
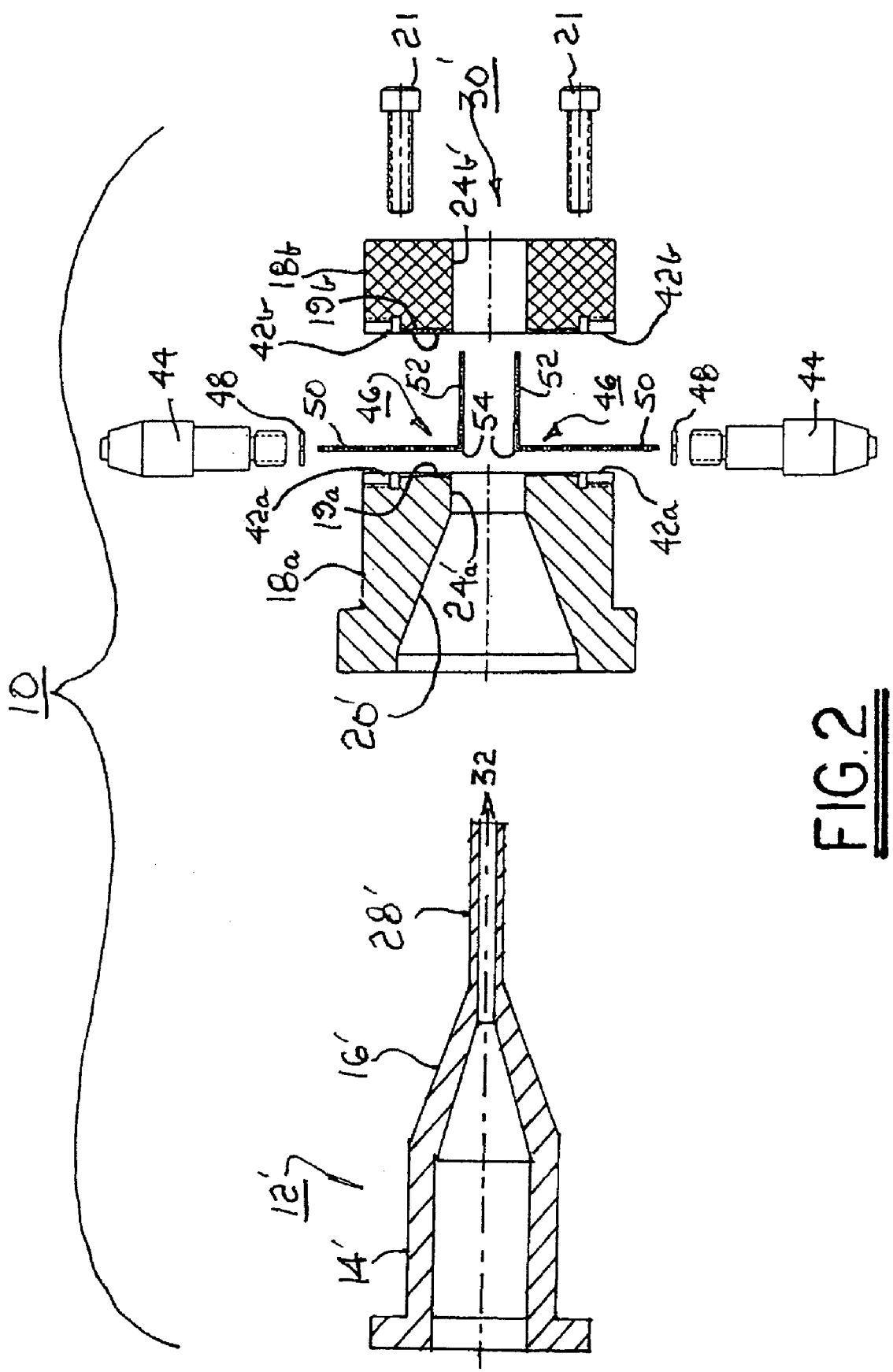
FIG. 2 is an exploded cross-sectional view of a first embodiment of a lumen-forming extrusion head in accordance with the invention.

Referring to FIG. 1, there is shown a portion of a typical prior art apparatus 10 for extruding a tubing extrudate having a central opening and two diametrically opposed lumens. Apparatus 10 includes a mandrel 12 having a cylindrical portion 14 (for forming a cylindrical flow passage with an outer cylindrical body, not shown) and a tapered portion 16. An extrusion die 18 includes a conically tapered entrance 20, for forming with portion 16 a conically tapered flow chamber 22 for extrudate material 23, typically a molten polymer, and a non-tapered passage 24, which may be cylindrical or any other cross-sectional shape required in the extrusion. An axial central bore 26 in mandrel 12 supports a pipe 28 extending to the end 30 of die 18 for providing air 32 to support the central opening in the extrusion. Pipe 28 also functions as an extrusion tip for forming a non-tapered flow chamber 34 terminating at die end 30.

Mandrel 12 is further provided with first and second bores 36a,36b parallel with central bore 26 and extending through tapered section 16 for receiving first and second lumen pipes 38a,38b which also extend through flow chamber 34 to end 30. Bores 36a,36b are located in fixed radial and azimuthal relationship to central bore 26. The lumen pipes are thus parts of mandrel 12. Lumen-forming material 40a,40b, which may be air or other liquid polymer or slurry, is provided through pipes 38a,38b, respectively.

Figure 3:
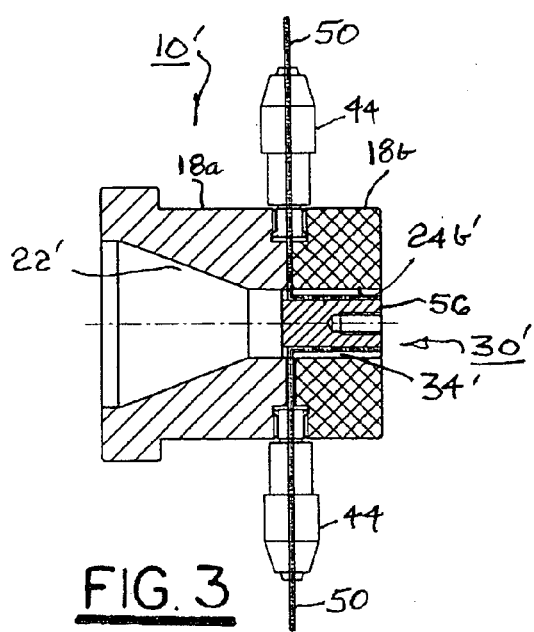
FIG. 3 is a cross-sectional view of a portion of the head shown in FIG. 2, showing use of a gauge block to position lumen pipes correctly.
Figure 4:
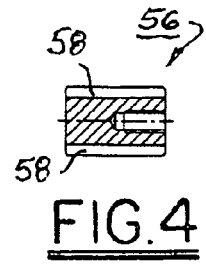
FIG. 4 is an axial cross-sectional view of a gauge block.
Figure 5:
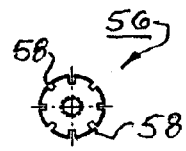
FIG. 5 is an end view of the gauge block shown in FIGS. 3 and 4.

Referring to FIG. 3, an improved lumen-forming extrusion head 10' in accordance with the invention (linearly exploded view) comprises a hollow mandrel 12' including a cylindrical portion 14' and tapered portion 16'. Mandrel 12' also preferably includes a tip portion 28' analogous to prior art pipe 28 for providing supporting air 32. Of course, alternatively, a continuous solid core material can be supplied for coating with a lumen-containing jacket through tip 28'.

As in the prior art example shown in FIG. 1, a cylindrical body surrounding mandrel 12' is omitted and should be assumed. Prior art die 18 is replaced by first and second die elements 18a,18b joinable along planar axial faces 19a,19b, respectively, as by bolts 21. Preferably, faces 19a,19b are surface ground to produce a tight seal therebetween. Element 18a includes a tapered entry 20' and a cylindrical portion 24a'. Die element 18b includes a portion 24b' that joins smoothly with portion 24a' and combines with tip portion 28' to form a flow passage 34'.

Axial faces 19a,19b are provided with mating features 42a,42b that define threaded radial wells and passages, when the faces are joined, for receiving first and second pin vises 44 and first and second welded lumen pipe assemblies 46. The pin vises are sealed by compression O-rings 48. Assemblies 46 each include first and second elements 50,52 meeting at a precise 90° joint 54 formed by microwelding of metal tubing along a 45° miter. Thus, joint 54 has a bend radius of zero. The pin vises are hollow chucks for receiving elements 50 to position lumen pipes 46 within the apparatus. After assembly, lumen pipes 46 extend beyond vices 44 (FIG. 3) for receiving lumen-forming materials 40a,40b (not shown here) as in the prior art.

Note that the lumen pipes enter the polymer flow stream in the cylindrical portion 34' thereof rather than in the conical portion 22' as in the prior art. The pipes thus present only a circular profile (element 50) transverse of polymer flow and a laminar profile (element 52) parallel to polymer flow through the die. Flow around element 50 heals without substantial continuing disturbance, and flow around and along element 52 smoothly opens the polymer for formation of a lumen at the downstream tip of each element 52.

Referring to FIGS. 2 through 5, during assembly of improved extrusion head 10', the lumen pipe assemblies are first positioned on either of faces 19a or 19b with pipe elements 52 extending into die element 18b in approximately the correct final position. Die elements 18a,18b are then joined, assembly elements 50 remaining both radially translatable and rotatable therebetween. The O-rings 48 and pin vises 44 are then passed over elements 50, and the pin vises are threaded into the die.

The correct location and orientation of the portions of pipe assemblies 46 extending into the die are established through use of a dedicated gauge block 56 having a shape and size closely matching the extrudate shape of die portion 24b'. In the example shown in FIG. 5, gauge block 56 is substantially cylindrical. Block 56 is formed to be easily and close-fittingly insertable into portion 24b' and is provided with precisely-machine axially-extending channels 58 on the outer surface thereof for receiving and positioning the lumen pipes precisely within portion 24b'. The bottoms of channels 58 define the radial positions of the lumen pipes, and the channels themselves precisely align the pipes with the axis of die element 18b. When the lumen pipes are properly positioned for use, pin vises 44 are tightened, and the gauge block is removed.

Assembly is completed by installation of mandrel 12' into the extruder body (not shown) and insertion of mandrel 12' into die elements 18a,18b to form the desired flow passages 22',34'. Of course, if adjustment or a change in radial position of a lumen is desired, the pin vise may be loosened and the position of the lumen pipe altered and re-secured, even during extrusive use of the head.

In an alternative assembly procedure, lumen pipe elements 52 may be placed in appropriate grooves 58 in the gauge block 56, and the gauge block then inserted into portion 24b' from the upstream side, until pipe element 50 are entered into their respective radial half-passages 42b in die section 18b. Section 18b is then bolted to section 18a, the pin vises are installed and tightened, and the gauge block removed from the downstream (exit) end 30' of the head.

Figure 6:
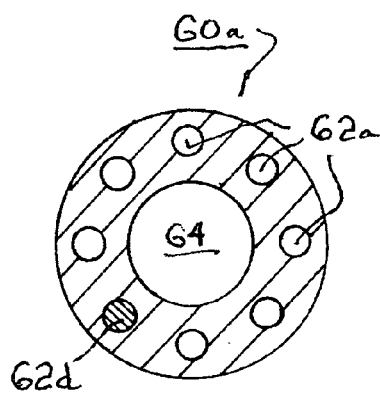
FIGS. 6 through 8 are cross-sectional views of three different and exemplary lumen-containing extrusions formable by apparatus in accordance with the invention.
Figure 7:
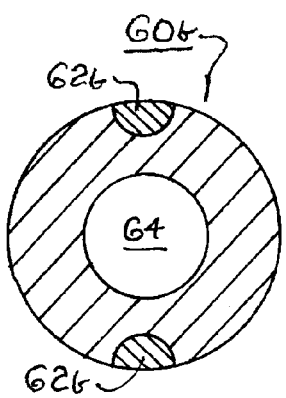
Figure 8:
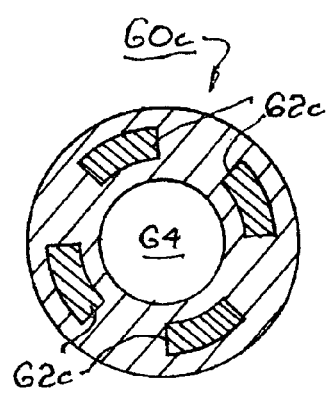

The cross-sectional shape of a lumen may be easily controlled by selecting the proper tip shape for the lumen pipe and properly locating the pipe radially within the die by means of its pin vise. FIGS. 6 through 8 illustrate three extrusion cross-sectional forms 60a,60b,60c including lumens 62a,62b,62c that may be readily provided by an extrusion head in accordance with the invention. Note that the lumens need not be identical in shape or content; lumen 62d in FIG. 6 differs from lumens 62a and may, for example, be filled with a radio-opaque material such as barium sulfate during extrusion. Note also that, although the diameter of the central passage 64 is the same in all three examples, to form these extrusions using prior art extrusion means such as is shown in FIG. 1 would required three separate mandrels 12 having three different patterns of bores 36. In improved extrusion head 10', only dies 18a,18b and lumen pipe assemblies 46 must be changed; mandrel 12' is unchanged.

Figure 9:
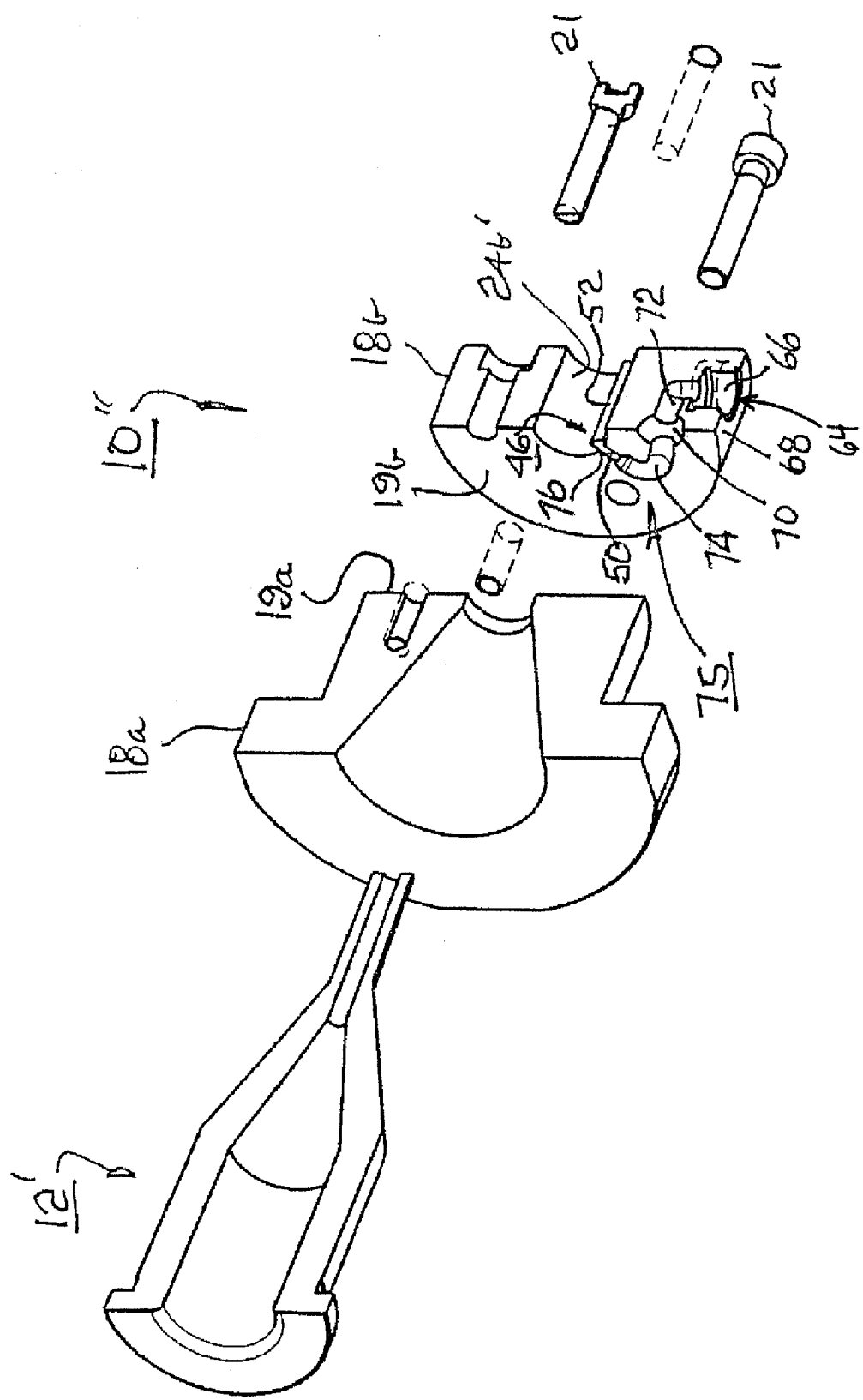
FIG. 9 is an exploded half isometric view of a second embodiment of a lumen-forming extrusion head in accordance with the invention.
Figure 10:
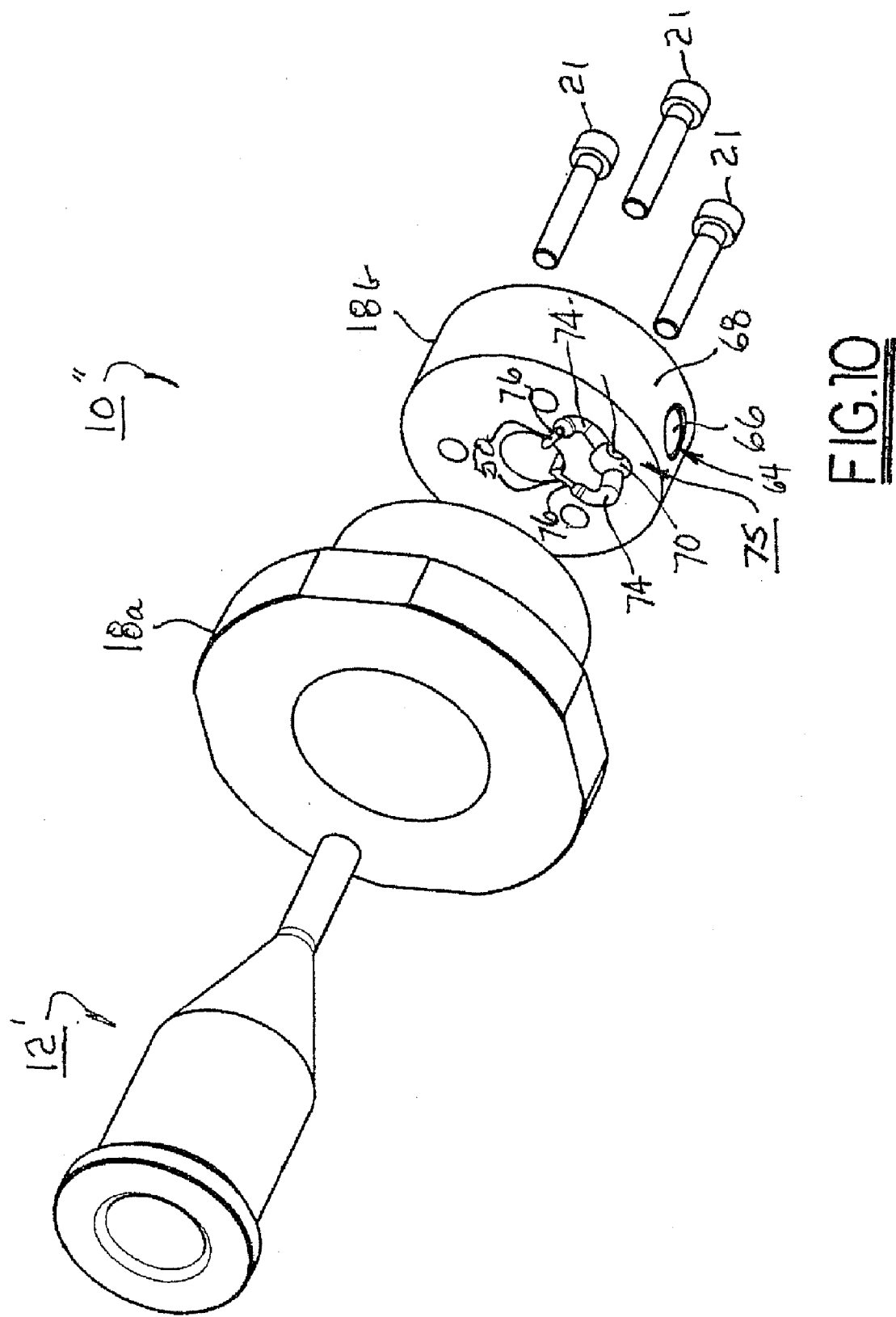
FIG. 10 is an exploded full isometric view of the embodiment shown in FIG. 9.

Referring to FIGS. 9 and 10, it may be desirable to form and supply a plurality of lumens from a single material source in applications wherein non-air materials are to be emplaced in the lumens. This is readily accomplished within the scope of the invention by including a manifold distribution system 75 within either or both of the die elements 18a,18b. In a currently preferred embodiment 10'', the distribution means is formed solely within die element 18b. An entry 64 is formed in the outer surface 66 of element 18b spaced apart from mating surface 19b. A distribution tank 68, preferably hemispherical, is formed in surface 19b and is connected via appropriate passages 70 with entry 64. A distribution runner 72 leads from tank 68 toward passage 24b' for each lumen intended. Preferably, the volume of tank 68 is at least ten times greater than the total volume of passages and runners 70,72. Runner 72 preferably is curved to end in a direction radial of passage 24b'. A smaller and shallower connecting passage 74 extends between each runner 72 and portion 24b' for receiving element 50 of a welded lumen pipe assembly 46, element 52 thereof extending appropriately into and along passage 34'. Preferably, passage 74 is so formed that element 50 is slightly compressed by face 19a during assembly of the head to effect a seal against leakage.

In embodiment 10'', no pin vises are employed, so preferably, the head is assembled with the appropriate removable gauge block (not shown) in place in portion 24b' to assure proper positioning of the lumen pipes. No adjustment of the pipes is possible after the head is assembled and operating.

One skilled in the art will recognize that various combinations of entries 64, tanks 68, and passages and runners 70,72,74 are possible to provide a very large possible number of lumen arrangements of varying lumen numbers, shapes, sizes, positions, and material contents. For example, two lumens having identical contents will be formed by the arrangement shown in FIG. 10. All such possible combinations are fully comprehended and anticipated by the invention.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An extrusion head for continuous extrusion of molten polymer in a predetermined cross-sectional shape, the molten polymer being supplied from a source, the cross-sectional shape including at least one lumen, the head comprising:
   a) an extrusion tip having an outer surface;
   b) an extrusion die surrounding said tip and having an inner surface cooperating with said tip surface to define a flow channel therebetween, said flow channel defining a direction of flow of said molten polymer in said head;
   c) at least one lumen pipe assembly extending through a wall of said die into said flow channel, said pipe assembly having a first portion extending transversely of said flow direction and a second portion extending parallel to said flow direction, said first and second pipe portions being joined at a right angle;
   d) means for adjusting the radial position of said lumen pipe assembly in said flow channel, wherein said means for adjusting includes a pin vise mounted in said wall of said die.

2. An extrusion head for continuous extrusion of molten polymer in a predetermined cross-sectional shape, the molten polymer being supplied from a source, the cross-sectional shape including at least one lumen, the head comprising:
   a) an extrusion tip having an outer surface;
   b) an extrusion die surrounding said tip and having an inner surface cooperating with said tip surface to define a flow channel therebetween, said flow channel defining a direction of flow of said molten polymer in said head;
   c) at least one lumen pipe assembly extending through a wall of said die into said flow channel, said pipe assembly having a first portion extending transversely of said flow direction and a second portion extending parallel to said flow direction, said first and second pipe portions being joined at a right angle;
   d) means for adjusting the radial position of said lumen pipe assembly in said flow channel, wherein said means for adjusting includes a removable gauge block.

3. An extrusion head for continuous extrusion of molten polymer in a predetermined cross-sectional shape, the molten polymer being supplied from a source, the cross-sectional shape including a plurality of lumens, the head comprising:
   a) an extrusion tip having an outer surface;
   b) an extrusion die surrounding said tip and having an inner surface cooperating with said tip surface to define a flow channel therebetween, said flow channel defining a direction of flow of said molten polymer in said head, wherein said extrusion die includes first and second parts joinable along mating surfaces thereof;
   c) a distribution manifold formed in at least one of said first and second die parts and including a plurality of runners;
   d) a lumen pipe assembly extending from each of said runners into said flow channel and being clamped between said mating surfaces, each one of said pipe assemblies having a first portion extending transversely of said flow direction from said runner and a second portion extending parallel to said flow direction, said first and second pipe portions being joined at a right angle; and
   e) means for adjusting the radial position of said lumen pipe assemblies in said flow channel, wherein said means for adjusting includes a removable gauge block.

* * * * *